Nov. 27, 1956      O. OLDBERG      2,771,750

PACKAGE AIR CONDITIONING UNIT FOR AUTOMOTIVE VEHICLE

Filed April 12, 1954      3 Sheets-Sheet 1

Inventor
Oscar Oldberg
By Hill, Sherman, Meroni, Gross & Simpson
Attys

Nov. 27, 1956          O. OLDBERG          2,771,750
PACKAGE AIR CONDITIONING UNIT FOR AUTOMOTIVE VEHICLE
Filed April 12, 1954          3 Sheets-Sheet 2
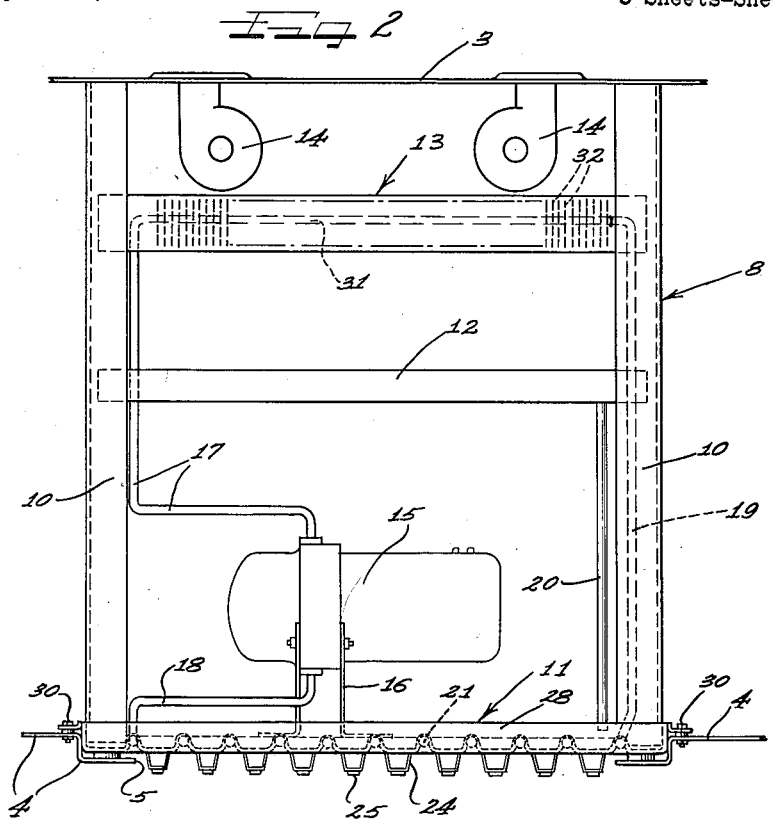
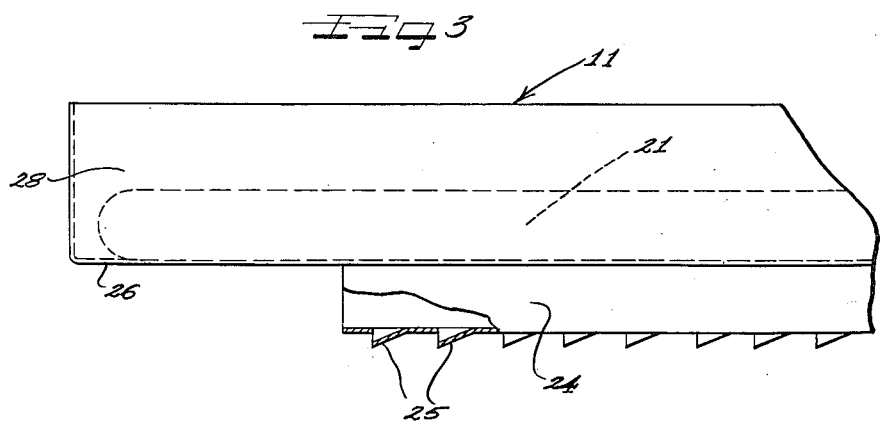
Inventor
Oscar Oldberg Nov. 27, 1956     O. OLDBERG     2,771,750
PACKAGE AIR CONDITIONING UNIT FOR AUTOMOTIVE VEHICLE
Filed April 12, 1954     3 Sheets-Sheet 3
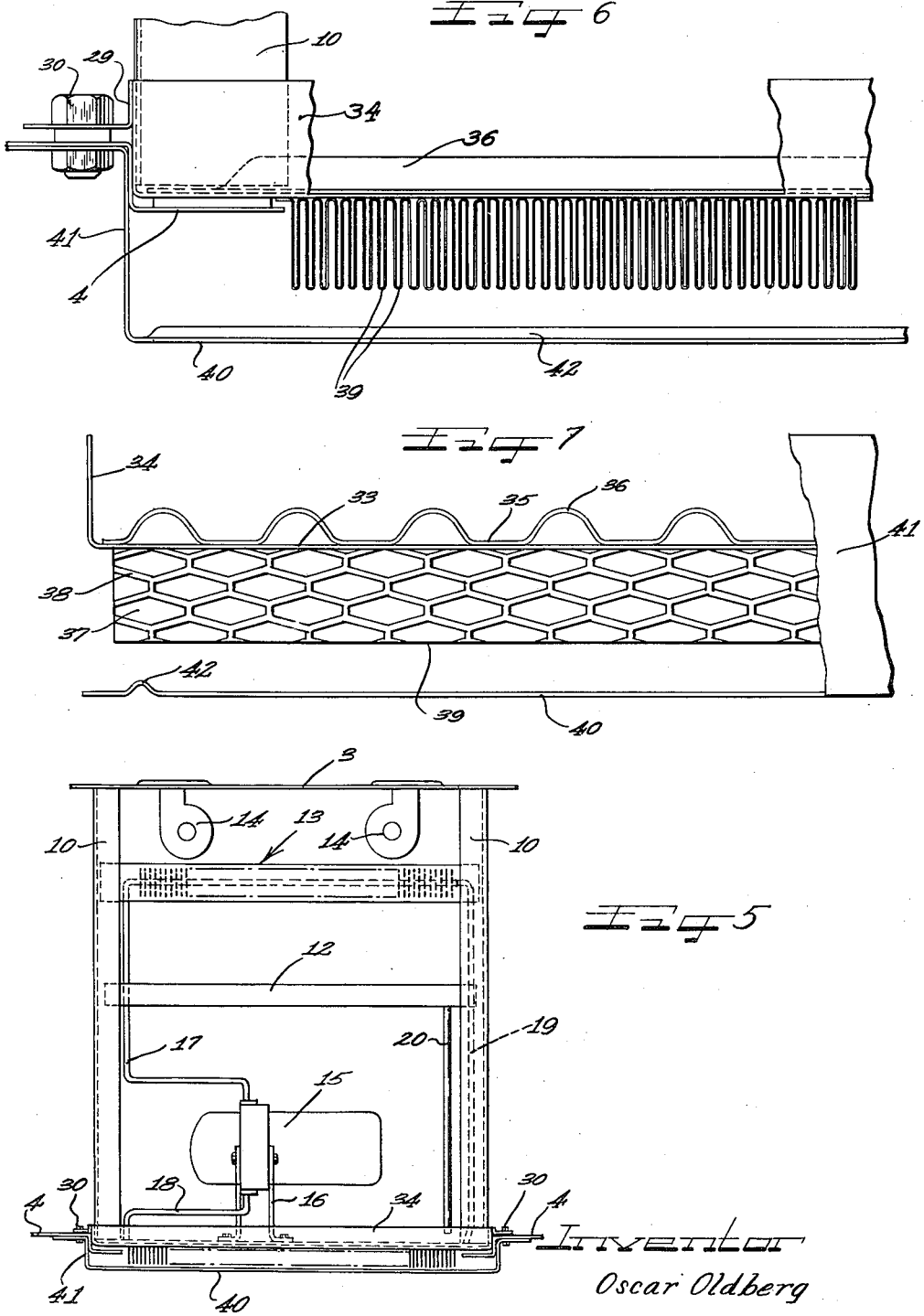

United States Patent Office 2,771,750
Patented Nov. 27, 1956

2,771,750

PACKAGE AIR CONDITIONING UNIT FOR AUTOMOTIVE VEHICLE

Oscar Oldberg, Huntington Woods, Mich., assignor to Houdaille Industries, Inc., Detroit, Mich., a corporation of Michigan Application April 12, 1954, Serial No. 422,308

2 Claims. (Cl. 62—117)

This invention relates to improvements in a package air conditioning unit for an automotive vehicle, and more particularly to an air conditioning unit that may readily and easily be installed in an automotive vehicle of the passenger automobile type, although the invention may be used in other type vehicles, and will have still other uses and purposes as will be apparent to one skilled in the art.

In the past, difficulty has been experienced in providing air conditioning means or units particularly for automobiles and similar vehicles. Such units have not been as satisfactory as desired for two reasons; namely, efficiency and effectiveness in operation, and the practically prohibitive cost. One of the main reasons for lack of efficiency and effectiveness was the inadequacy of the essential condenser in such a system. Another difficulty heretofore experienced has been to locate the various parts of the structure in effective operating relationship as to the other parts. Also, heretofore, insofar as I am aware, no one has successfully provided what might properly be termed a "package" unit, in which one unit, readily and easily installed in a vehicle, contains all the salient parts of an air conditioning system, and it is only necessary to effect a driving connection for the compressor. In the past, where air conditioning systems have been installed, the salient parts thereof have been located wherever space was found, and in somewhat scattered arrangement, thereby rendering it objectionably costly to install the system in a vehicle already completed and in operation.

With the foregoing in mind, it is an important object of the instant invention to provide an economical and highly efficient air conditioning unit for a vehicle or the like, which unit is in the form of a package for ready and easy installation in the vehicle.

Another object of the invention resides in the provision of a complete vehicle air conditioning unit, highly desirable for use in the common form of passenger automobile, and which may readily and easily be installed beneath the package shelf behind the rear seat of the automobile, and all that is necessary in addition to such installation is a connection for driving the compressor.

Still another object of the invention resides in the provision of an air conditioning unit for a vehicle, and wherein the condenser is exposed to ambient air externally of the vehicle thereby adding to the efficiency of operation.

It is also a feature of this invention to provide an automotive air conditioning unit embodying a condenser which is effectively cooled both by large surface radiation and by evaporative cooling simultaneously.

Another feature of the invention resides in the provision of an air conditioning unit for an automotive vehicle, the unit being of the package type, and wherein the condenser functions as the bottom pan for the unit and also as a drip pan, whereby the condenser is subject to surface cooling by traveling air, and also to evaporative cooling by evaporation of the condensate collected in the drip pan.

It is a further object of the invention to provide an air conditioning unit for an automotive vehicle, which unit embodies a condenser having relatively large and numerous radiating fin-like structures projecting therefrom with means associated therewith to insure ambient air being thrown against the extensive condenser surfaces during travel of the vehicle.

Still a further object of the invention is the provision of an automotive air conditioning unit, in which scoop or elevating means are provided to direct air over the surface of the condenser as the vehicle travels to add to the cooling capacity of the condenser.

While some of the more salient features, characteristics and advantages of the instant invention have been above pointed out, others will become apparent from the following disclosures, taken in conjunction with the accompanying drawings, in which—

Figure 2 is a fragmentary, somewhat diagrammatic view illustrating the conditioning unit in elevation, taken from the right-hand side of Fig. 1, in other words a rear view of the unit in operative position;

Figure 3 is a fragmentary enlargement of the lower left-hand corner portion of the structure shown in Fig. 1, this figure illustrating only the condenser structure, other parts being omitted;

Figure 5 is a view similar in character and location to Fig. 2, but illustrating a slightly different form of the invention;

Figure 6 is a fragmentary enlargement of the lower left-hand portion of Fig. 5; and Figure 7 is a fragmentary view of the structure of Fig. 6, taken from the left-hand side thereof.

As shown on the drawings:

Figure 1:
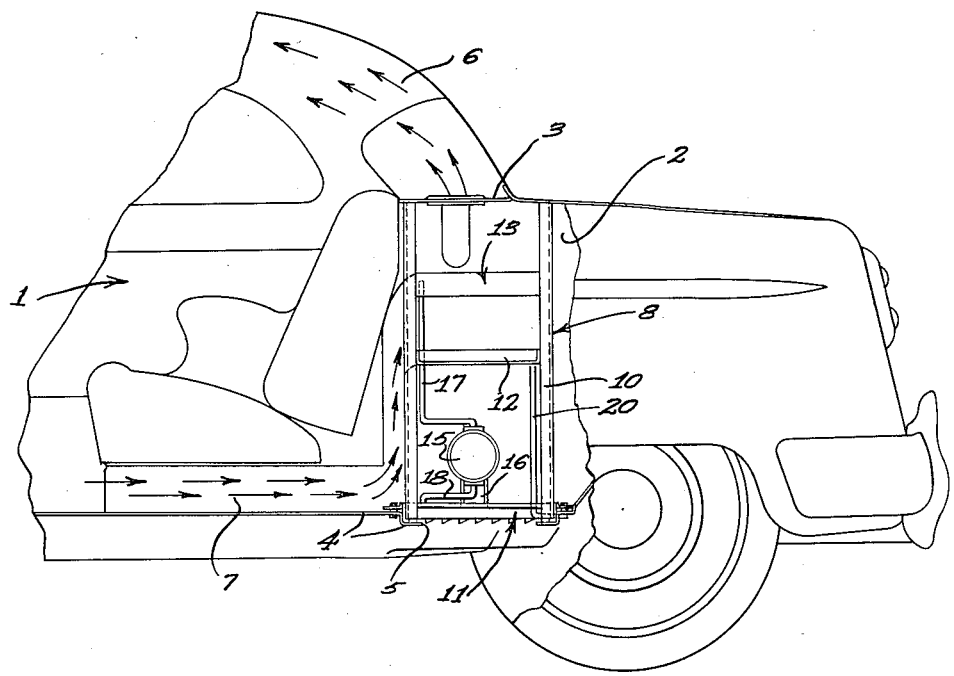
Figure 1 is a fragmentary diagrammatic view of the rear end of a passenger automobile, illustrating an air conditioning unit embodying principles of the instant invention operatively installed therein, the conditioning unit being shown in side elevation.

The first illustrated embodiment of the instant invention, Figs. 1 to 4 inclusive, is shown in operative position in Fig. 1 in a standard passenger automobile generally indicated by numeral 1. The air conditioning unit is disclosed in the luggage compartment 2 immediately behind the rear seat of the automobile, and beneath the parcel shelf 3 of the automobile. To install the air conditioner, an opening is made in the trunk floor 4 of the car, as indicated at 5, to expose the condenser portion of the unit to ambient air, and openings are provided in the package shelf behind the rear seat to afford discharges for cool air into the body of the car. As seen in Fig. 1, the circulation of air through the body of the car is generally upward out of the twin openings in the package shelf 3 forward under the car roof, downward inside the car, and the return to the conditioning unit is along the floor underneath the seat or seats of the automobile, upwardly for a distance behind the rear seat, and into the conditioner so that the air may pass again over the cooling coils or evaporator of the conditioning unit. In Fig. 1 I have indicated the start of the circulation by arrows 6, and the completion of the circulation by arrows 7.

At the outset, it should be noted that the entire conditioning unit, designated in general by numeral 8, is in the form of a package or self-contained unit, and may be entirely installed in the luggage compartment of the automobile, substantially beneath the package shelf. No salient part of the conditioning unit need be located anywhere else, and after installing the unit as above described, it is only necessary to establish some operative connection to the compressor of the conditioning unit, and this may be by way of either a mechanical drive, or if a sufficiently high voltage is provided, the compressor may be actuated by an electric motor.

The entire air conditioning unit is preferably self-contained in a skeleton type frame comprising corner posts in the form of angle irons 10, of which there are usually four in the completed structure. These posts will be held together by other elements of the apparatus spot welded or equivalently secured thereto. It is not necessary to enclose the unit over the sides between the corner posts, because of the disposition of the unit in the luggage compartment of the vehicle, but such side enclosures would probably be utilized at least if one side surface of the unit were exposed to ambient air. Secured to these uprights at the bottom is a combination condenser and condensate pan, generally indicated by numeral 11, and spaced thereabove is another condensate pan 12 above which is a coolant coil or evaporator assembly generally indicated by numeral 13. Above the evaporator is one or more (two being shown) blower fans 14 which discharge through the package shelf 3 of the vehicle into the body.

A compressor unit 15 is located at any suitable place inside the frame structure, and as illustrated is supported from the condenser-condensate pan 11 by means of upstanding legs or brackets 16. The suction side of the compressor 15 is connected with the evaporator 13 by a suction line 17, and the high pressure side is connected to the condenser by way of a pressure line 18. Refrigerant inside the closed system circulates from the high pressure side of the compressor through the pipe 18, through the condenser 11, up to the evaporator by way of a pipe 19, through the evaporator, and returns in all or partially gaseous form back to the compressor through the line 17.

Any condensate dripping from the evaporator falls into the pan 12 from which it gravitates through a pipe 20 into the pan portion of the condenser 11. Any condensate that may form on the bottom of the pan 12 or in any parts therebelow, will obviously gravitate into the pan part of the condenser.

Figure 4:
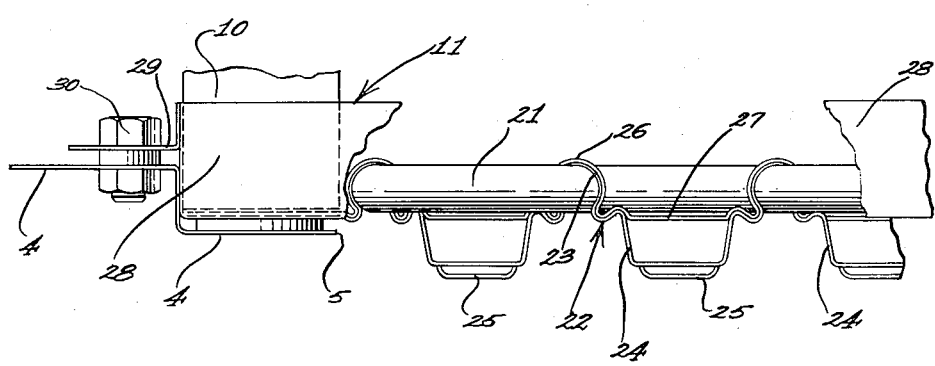
Figure 4 is a fragmentary enlargement of the lower front corner portion of the structure seen in Fig. 2.

With reference now more particularly to Figs. 3 and 4, it will be seen that the combination condensate pan and condenser 11 includes a sinuous tube 21 connected at one end to the pipe 18 and at the other end to the pipe 19. There is a metallic sheet, generally indicated by numeral 22, forming the actual bottom of the structure, and this sheet is embossed to embrace the parallel portions of the sinuous tube 21, by substantially encircling the same as indicated at 23 in Fig. 4. Between parallel reaches of the tube 21, this bottom sheet is embossed in the opposite direction to form a box-like fin 24, and along the bottom of each box or tube-like fin 24 cuts are periodically made and portions struck obliquely downwardly to form air scoops 25, which scoops front in the direction of travel of the vehicle to guide ambient air upwardly inside each box or tube-like fin 24. Another sheet of heat conductive metal, 26, is superposed on and secured to the sheet 22 and is embossed and contoured around the parallel sections of the tube 21 along with the sheet 22 as is clearly seen in Fig. 4. However, this inner sheet 26 extends substantially flatly between adjacent parallel reaches of the tube 21 as indicated at 27, and in effect forms an upper closure for each tube or box-like fin 24. Thus there is provided considerable radiating surface, augmented by a direct blast of ambient air over that surface, caused by the open ended tubular fins 24 and the air scoops 25 therealong.

As seen in Fig. 3, the sheet 22 extends laterally beyond the tubular fins 24, and encloses the bends of the sinuous tube 21. The edge portions of the sheet 26 are turned upwardly as at 28 to form an upstanding side wall entirely around the condenser assembly, which side wall also embraces the frame members 10 to rigidify the entire unit. As seen best in Figs. 2 and 4, angle brackets 29 are secured to the wall 28 of the condenser assembly and are bolted or equivalently secured to the trunk floor of the vehicle as indicated at 30.

From the showing in Fig. 2, it will be noted that the drain pipe 20 from the upper condensate pan 12 merely enters the pan-like area defined by the wall 28 on the condenser, so that the drippings through the pipe 20 fall in the condenser adjacent the sinuous tube 21. Such drippings are allowed to evaporate from the condenser pan, and this evaporation adds greatly to the effective cooling capacity of the condenser as a whole.

The evaporator structure 13 embodies a sinuous tube 31 connected at one end to the line 19, and at the other end to the line 17. Around the parallel portions of the sinuous tube 31, or more particularly carried by each leg thereof, is a series of numerous relatively thin metallic fins 32 that are highly conductive in character.

In operation, the instant invention is extremely effective. The compressor 15 is energized either mechanically or electrically from a power source in the vehicle, compresses the refrigerant in the system and forces the refrigerant through line 18 into the sinuous tube 21 of the condenser. Here the fluid is reduced in temperature both by way of cool air traveling over the extensive condenser surface, and guided against that surface by the scoops 25, as well as by evaporation of condensate from the condenser pan. This gives a very effective cooling action, and the liquid refrigerant passes up the line 19 for expansion inside the evaporator part 13, after which the gaseous or partially gaseous refrigerant descends the line 17 to the compressor. At the same time, blower fans 14—14 are operating to draw the air over the exposed fins 32 of the evaporator, and pass the chilled air through the package shelf into the interior of the vehicle. It will be noted that the entire structure is in the form of a package unit and can readily be installed in a vehicle already completed and in operation, as well as incorporated in a vehicle under manufacture.

In Figs. 5, 6 and 7 I have shown a slightly different form of construction. The difference between the showing in Figs. 5, 6 and 7 and that previously described resides in the construction of the combination condensate pan and condenser, the other parts being the same as above described.

In this instance, the condenser embodies a bottom sheet 33 having upstanding side walls 34 associated with the frame members 10 in the same manner as previously described, the element forming a collecting pan for condensate. This pan-like element 33—34 is not embossed in any manner in this instance, and the sinuous tube arrangement for connection with the lines 18 and 19 is formed solely in a second sheet 35 having integral sinuous embossing 36 therein, and being secured to the bottom sheet 33 between the embossed channels. In order to provide more cooling service on this condenser structure, a sheet of heat conductive metal 37, embossed as shown at 38 in Fig. 7, is formed by numerous reverse bends into a plurality of alternating tubular fins 39 as seen in Fig. 6 and is secured to the bottom of the sheet 33 by brazing, spot welding, or in an equivalent manner. It will be noted that air not only passes through the tubular sections of these fins, but also through the open bottomed spaces alternating with the tubular sections. Spaced below the fins 39 is a pan-like member 40 which is open at the ends, but has upstanding side walls 41 with the upper margins thereof turned laterally and held by the attaching bolts 30—30. At the open forward end of the member 40, the bottom is upwardly beaded as at 42 in order to guide ambient air upwardly against the fins 39, as the vehicle travels forwardly.

The arrangement shown in Figs. 5, 6 and 7 provides a very economical condenser structure, and one which augmented by the evaporation of condensate, may be even more effective or possess a higher efficiency than the structure shown in Figs. 1 to 4 inclusive.

The structure disclosed in Figs. 5, 6 and 7 operates in substantially the same manner as that previously described.

It will be understood that modifications and variations may be effected without departing from the scope of the novel concepts of the present invention.

I claim as my invention:

1. In a vehicle having a package shelf and a luggage compartment, a complete air conditioning unit mounted in the luggage compartment beneath said shelf comprising a frame structure housing air circulating means communicating with the interior of the vehicle through said package shelf, evaporator means horizontally disposed beneath said air circulating means, a condensate catching pan in underlying spaced relationship therewith for collecting the condensate drippings from the evaporator, passage means intercommunicating the interior of said vehicle with said evaporator means above the condensate pan for providing air circulation, a condenser defining the closed bottom of the structure and having upstanding side walls forming a pan, the underside being exposed to the ambient air, means for guiding the condensate from said pan to the condenser pan to enhance the efficiency of said condenser, and a compressor between said pan and condenser.

2. In a vehicle having a package shelf and a luggage compartment, a complete air conditioning unit mounted in the luggage compartment beneath said shelf comprising a frame structure housing air circulating means communicating with the interior of the vehicle through said package shelf, evaporator means horizontally disposed beneath said air circulating means, a condensate catching pan in underlying spaced relationship therewith for collecting the condensate drippings from the evaporator, passage means intercommunicating the interior of said vehicle with said evaporator means above the condensate pan for providing air circulation, a condenser defining the closed bottom of the structure and having upstanding side walls forming a pan, the underside being exposed to the ambient air and carrying air guiding means to direct the ambient air flow thereagainst, means for guiding the condensate from said pan to the condenser pan to enhance the efficiency of said condenser and a compressor mounted between said pan and condenser.

References Cited in the file of this patent
UNITED STATES PATENTS

| | | |
|---|---|---|
| 1,973,116 | Shutts | Sept. 11, 1934 |
| 2,294,036 | Kettering | Aug. 25, 1945 |
| 2,479,170 | Kuempel | Aug. 16, 1949 |
| 2,480,510 | Roper | Aug. 30, 1949 |
| 2,559,009 | Kuempel | Sept. 25, 1951 |
| 2,626,509 | Morrison | Jan. 27, 1953 |
| 2,667,042 | Anderson | Jan. 26, 1954 |